Nov. 3, 1964  D. J. OLTON ET AL  3,154,896

ABRADING HONEYCOMB METAL

Filed July 30, 1962

INVENTORS
WILLIAM A. FAZIOLI
DIRCK J. OLTON

BY *Hugh C. Smith*

ATTORNEY

United States Patent Office 3,154,896
Patented Nov. 3, 1964

3,154,896
ABRADING HONEYCOMB METAL
Dirck J. Olton, Loudonville, and William A. Fazioli, Troy, N.Y., assignors to Norton Company, Troy, N.Y., a corporation of Massachusetts
Filed July 30, 1962, Ser. No. 213,300
2 Claims. (Cl. 51—328)

The present invention relates in general to abrading metal and more particularly to a method for abrading cellular or honeycombed metal structures.

The use of thin-wall honeycomb metal structures for heat exchangers, structural reinforcements and the like has been rapidly increasing. The extreme thinness of the usual cell wall in honeycomb metal structures has limited the end use to areas where extreme finish is not necessary. Cutting of these structures transverse to the longitudinally extending cellular structure has invariably developed burrs which close some of the cells and, in the case of heat transfer equipment, render the product useless. Efforts to grind the face of such honeycomb material to bring the same to a high finish or to meet a close tolerance as for example in the regenerator component for a gas turbine engine have, heretofore, been unsuccessful due to burr formation.

Accordingly, it is an object of the present invention to provide a method for grinding the face of cellular honeycomb metal.

A further object of the invention is to provide a method for bringing the face of cellular honeycomb metal to a close tolerance without the formation of burrs.

Another object is to effect such grinding of honeycomb metal using a coated abrasive belt.

Additional objects, if not specifically set forth herein, will be readily apparent to one skilled in the art from the following detailed description of the invention:

Generally, the present invention involves mounting the honeycomb metal structure to be ground in a suitable fixture which permits substantial pressure to be applied to the face of the structure without movement of the structure as a result of such pressure; utilizing a moving coated abrasive belt to supply such pressure (the belt being run over a hard durometer contact wheel); and simultaneously oscillating the belt and rotating the honeycomb structure as such pressure is applied to effect grinding of the honeycomb sections in opposing directions.

Figure 1:
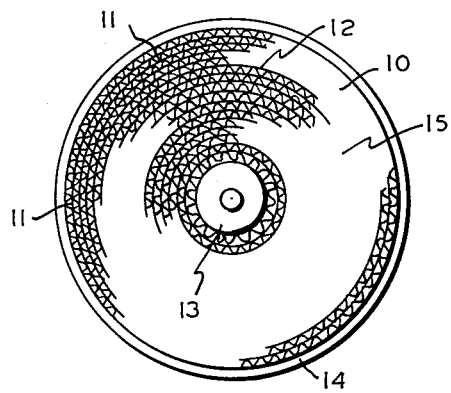
FIGURE 1 is a plan view of a honeycomb metal structure of the type treated by the present invention.

More specifically, and referring now to the drawings, FIGURE 1 illustrates one of the more critical types of honeycomb metal structures 10 adapted to be treated according to the present invention. Here, a plurality of honeycomb sections 11 made from 0.002" stainless steel foil and separated from one another by stainless steel rings 12 also of 0.002" thickness are disposed in concentric circles about a solid central stainless core 13 of approximately 3" diameter and surrounded by an outer stainless steel rim 14, 1" in width. The particular structure illustrated is a regenerator unit for gas turbine engines and is 17" in diameter and about 3" in depth. The steel is #430 stainless steel and the sections are brazed to form a unitary structure. Since gases are to pass through the small honeycomb sections, these must be kept open and free from burrs. Forming as it does a part of an engine, it becomes necessary to grind the face 15 shown in FIGURE 1 to a particular tolerance and finish.

Figure 2:
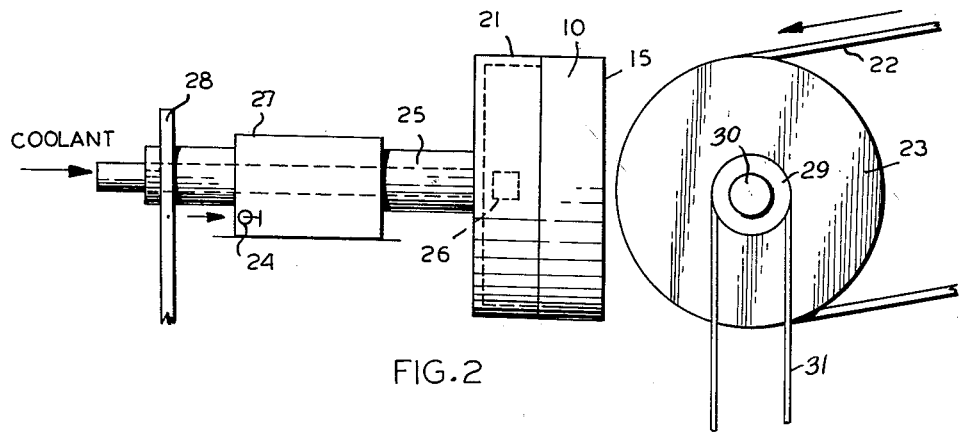
FIGURE 2 is a diagrammatic illustration of the method and means of the present invention as applied to abrading the structure of FIGURE 1.

Referring now to FIGURE 2, there is illustrated the means whereby effective commercial grinding of a structure such as illustrated in FIGURE 1 may be accomplished. The structure to be ground 10 is placed in and firmly held to a supporting chuck 21 by any suitable clamping means known in the art. The face 15 to be ground is faced outwardly from chuck 21. The chuck 21 is so mounted as to be capable of rotation as through shaft 25, bearing 27 and drive pulley 28, and also movement towards the abrasive belt 22 shown trained over an oscillating contact roll 23 of hard (70) durometer rubber. The contact roll 23 is mounted for rotation through drive pulley 29 fixed to the contact roll shaft 30, and is driven by a drive belt 31 trained over pulley 29 and connected to any suitable power source (not shown). The movement toward the belt may be accomplished by either making the chuck assembly movable as by a micrometer screw advancement 24 or by making the belt assembly movable. One or the other should be capable of adjustment to permit the grinding to continue as stock is removed. The shaft 25 supporting chuck 21 is preferably hollow to permit a coolant conduit 26 to extend therethrough. As grinding takes place, the coolant is fed from a suitable source (not shown) through conduit 26 and sprays through the honeycomb cell structure (shown at 11 in FIGURE 1) to cool the face 15 of the work and also to flush out any small particles which tend to penetrate any of the honeycomb cell openings as grinding progresses.

The structure being ground is preferably rotated at about 2 r.p.m. during removal of the desired amount of stock. During the stock removal the fixture 21 carrying the structure being abraded is advanced towards the belt 22 by micrometer adjustment 24 at a rate of about 0.001" to 0.002" per minute. After the desired amount of stock is removed the rotation of the fixture 21 is increased to about 80 r.p.m. for the finishing operation. The grinding takes place along a diameter of the structure being ground, with the line of contact between the abrasive belt 22 and the face 15 of the honeycomb being along such diameter. Preferred belt speed is about 3500 surface feet per minute and the contact wheel is oscillated at a rate of 200 cycles per minute with an axial movement of about ½".

Since the abrasive belt is used wet, a conventional waterproof abrasive is used such as Speed-Wet Metalite Cloth, a resin-bonded, cloth-backed aluminum oxide coated abrasive. The grain size may be varied somewhat but generally should range from 100 to 150 mesh.

After abrading for a period of 12½ minutes, the surface 15 was found to be finished to a tolerance of 0.003" total indicator runout and a surface finish of 8 microinches R.M.S. The honeycomb cells were burr-free and clean.

Obviously, many variations may be made without departing from the spirit and scope of the invention as disclosed herein and therefore only such limitations should be imposed as are contained in the appended claims.

We claim:
1. A method for abrading a transverse section of thin-wall honeycomb metal which comprises:
   (a) Rotating the section of honeycomb metal;
   (b) Contacting the section of honeycomb metal along a complete diameter thereof as it rotates with a moving coated abrasive surface; and
   (c) Continuously flushing said honeycomb section with coolant along said diameter during contact with said abrasive.

2. A method for abrading a transverse section of thin-wall honeycomb metal which comprises:
   (a) Rotating the section of honeycomb metal at from 2 to 80 revolutions per minute;
   (b) Contacting the section of honeycomb metal along a complete diameter thereof as it rotates with a coated abrasive surface;
   (c) Continuously moving the coated abrasive surface at right angles to the direction of rotation of said transverse section as it contacts said section; and
   (d) Continuously flushing said honeycomb section with coolant passing through said honeycomb at least along said diameter during contact with said abrasive surface.

References Cited in the file of this patent

UNITED STATES PATENTS

| | | |
|---|---|---|
| 185,227 | Haley | Dec. 12, 1876 |
| 1,337,140 | Kimmel | Apr. 13, 1920 |
| 1,469,985 | Bath | Oct. 9, 1923 |
| 2,341,442 | Hulbert | Feb. 8, 1944 |
| 2,489,811 | Perkins | Nov. 29, 1949 |
| 2,632,288 | Diller | Mar. 24, 1953 |
| 2,699,019 | Dackor et al. | Jan. 11, 1955 |